Patented Jan. 15, 1952

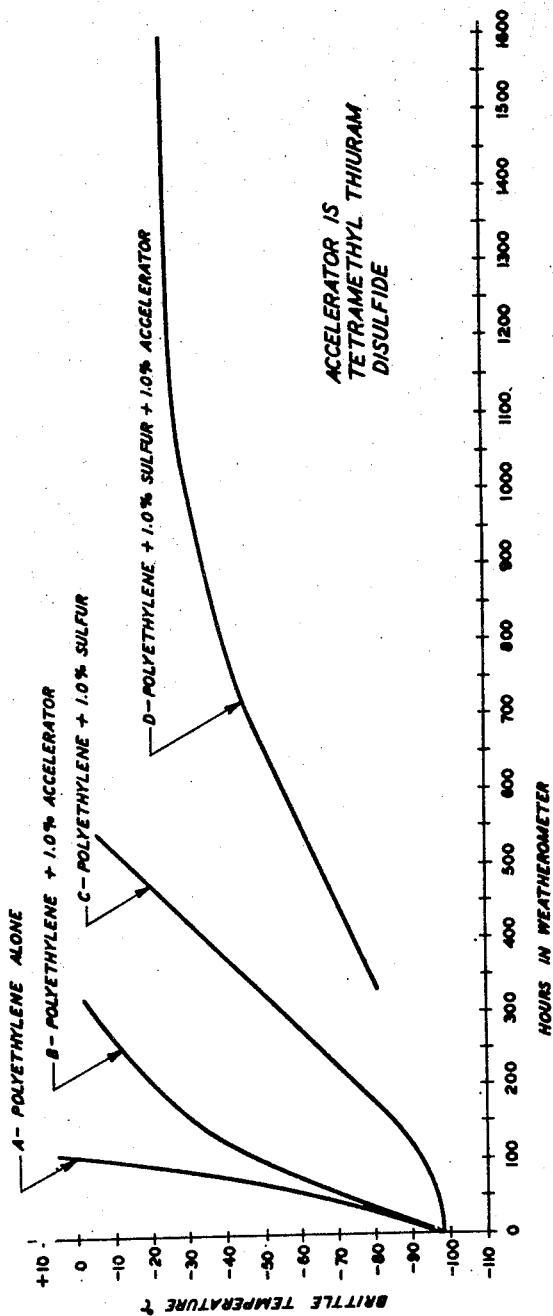

2,582,510

UNITED STATES PATENT OFFICE 2,582,510

POLYETHYLENE STABILIZED WITH SULFUR PLUS A VULCANIZATION ACCELERATOR

Bartholomew A. Stiratelli, Summit, N. J., assignor to Bell Telephone Laboratories, Incorporated, New York, N. Y., a corporation of New York Application December 5, 1947, Serial No. 789,880

7 Claims. (Cl. 260—45.7)

This invention relates to stabilized age-resistant compositions comprising solid high molecular weight polymers of monoolefins. In particular, this invention relates to a composition stabilized by the addition of sulfur and an accelerator.

According to this invention, a mixture of sulfur and a member of a certain class of accelerators of the vulcanization of rubber is added to a polymerized monoolefin to render it resistant to degradation from aging and weathering and particularly from the effects of the oxygen of the air. It has been found that the sulfur and the accelerator coact in an unexpected way to produce a superior product which will be described in more detail later.

In handling high molecular weight polymers of monoolefins difficulty has been encountered in maintaining the physical characteristics of the material during storage, in high temperature processing and in uses where it is subjected to weathering. The polymers are found to have a tendency to disintegrate or depolymerize when subjected to the effects of the atmosphere. The polymers are particularly subject to oxidation from the oxygen of the air. This reaction is catalyzed by ultraviolet light, and it is believed to cause a fission of the long hydrocarbon chains into smaller fragments, thus changing the polymer from a tough flexible substance to a weak brittle one.

To protect the polymers from this degradation, various substances have been added to the polymers during their processing. It has frequently been found that these added substances have an undesirable effect on the properties of the polymer. For example, they tend to degrade the electrical properties of the polymer and to produce an undesirable color effect upon outdoor exposure. Also it is frequently difficult to disperse these stabilizing substances throughout the mass of the polymer on a commercial scale; thus their effectiveness in protecting the polymer is lessened.

Thus among the objects of the present invention are to produce a stabilized age-resistant composition from a high molecular weight monoolefin polymer which is easy to make, which has good electrical properties, and which has good color characteristics.

According to the present invention an unexpected beneficial result is obtained when certain accelerators of the vulcanization of rubber are added together with sulfur to a polymerized monoolefin which is free from admixture with any substance which undergoes an observable vulcanization with sulfur. Ordinarily accelerators are known to increase the rate of sulfur vulcanization of normally vulcanizable polymers having substantial amounts of carbon-to-carbon unsaturation, but it is not believed ever to have been discovered or suggested that certain accelerators would enhance the stabilizing action of sulfur on substantially saturated substances considered to be unvulcanizable, such as the monoolefin polymers. As will be shown more fully later, according to the present invention, samples containing both an accelerator and sulfur are far more stable than would be expected judging from the result obtained when sulfur and the accelerator are used in the polymer separately. The sulfur and the accelerator apparently coact in an unexplained manner to give the superior stabilized product of the present invention.

Although the following description refers specifically to the solid high molecular weight polymers of ethylene, known as polyethylene, it applies to other polymerized monoolefins as well, such as polyisobutylene or polystyrene. It, however, does not apply to compounds having a high degree of unsaturation which may be vulcanized in the manner of natural rubber.

According to the preferred embodiment of the present invention, from about 0.01 per cent to about 5 per cent or 6 per cent by weight of sulfur is added to polyethylene. The preferred amount is usually from about 0.1 per cent to about 2 per cent by weight. More than 5 or 6 per cent of sulfur may be used if desired, but the greater the amount of sulfur that is used, the more chance there is that it will bloom to the surface.

The accelerators which are active to enhance the stabilizing action of the sulfur are compounds containing the following general structural group:

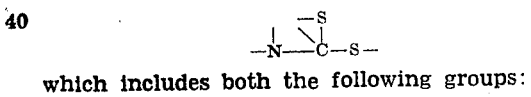

which includes both the following groups:

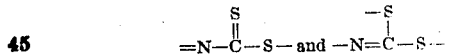

One class of these compounds is the thiuram sulfides, among which are the tetraalkyl-thiuram sulfides, which have the following general formula:

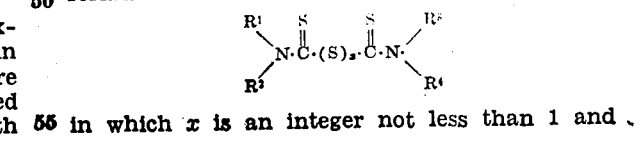

in which $x$ is an integer not less than 1 and preferably not greater than 2, and $R^1$, $R^2$, $R^3$, $R^4$ are alkyl radicals, preferably methyl or ethyl groups.

Among the most common and most suitable compounds of this kind are tetramethyl-thiuram-disulfide, tetraethyl-thiuram-disulfide, tetramethyl-thiuram-monosulfide and tetraethyl-thiuram-monosulfide.

Another thiuram sulfide suitable for use in the present composition is dipentamethylene-thiuram-tetrasulfide, having the follownig formula:

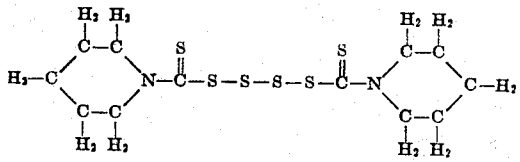

Also included in the type of compounds which may be used as accelerators according to the present invention is the class of compounds known as dithiocarbamates, which has been assigned the following general formula:

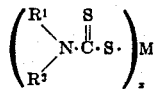

wherein $x$ is a small integer not less than 1 and not greater than 4, and wherein $R^1$ and $R^2$ are alkyl radicals, preferably containing not more than 4 carbon atoms, and M is a metal such as zinc, copper or lead, or a metalloid, such as selenium. Common members of this group suitable for the purposes of the present invention are zinc dimethyl dithiocarbamate, zinc diethyl dithiocarbamate, copper diethyl dithiocarbamate, selenium dimethyl dithiocarbamate and selenium diethyl dithiocarbamate.

A third class of compounds falling within the general group suitable for the purposes of the present invention are the thiazyl sulfides, including mercaptobenzothiazole, zinc 2-mercaptobenzothiazole, cupric 2-mercaptobenzothiazole and benzothiazyl disulfide, which contain the following functional group:

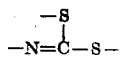

The accelerator may be used in amounts of from about 0.01 per cent to about 2 per cent by weight. The preferred amount of accelerator is usually from about 0.25 per cent to about 1 per cent by weight.

A more comprehensive understanding of this invention may be obtained by reference to the accompanying drawing, which shows curves indicating the relationship of the brittle point of various polyethylene mixtures to the time spent in a device which produces accelerated weathering.

The desirable results obtained by the present invention are illustrated by the drawing, which shows the effects on the age resistance of polyethylene, measured in terms of brittle point, of the addition of sulfur with and without accelerators. The weatherometer which was used to age the samples is a device which produces artificial weathering, such that 100 hours of accelerated weathering in the machine is approximately equal to one year's weathering outdoors. Curve A shows the effect on the brittle point of unstabilized polyethylene of artificial weathering in the weatherometer for various periods of time. Curve B shows the same for polyethylene containing 1 per cent by weight of the accelerator tetramethyl-thiuram-disulfide, curve C for polyethylene containing 1 per cent by weight of sulfur, and curve D for 1 per cent by weight of sulfur plus 1 per cent by weight of tetramethyl-thiuram-disulfide. Curve D shows the unexpected improvement obtained by adding 1 per cent of tetramethyl-thiuram-disulfide to polyethylene containing 1 per cent sulfur. All of the above compositions were prepared by milling the added ingredients into the polyethylene above its softening point. A similar degree of improvement over the stabilization given by sulfur alone is obtained by adding any of the other accelerators of the classes referred to above.

Curve D also shows that after about 800 hours in the weatherometer a decrease in the rate of change of the brittle point occurs, and that after 1100 hours in the weatherometer, there is little further change in the brittle point, indicating that the degradative reaction occurs at a very slow rate after long exposure to weathering. It will be noted that curves B and C show that in samples where sulfur and an accelerator were not used in conjunction with each other, the degradative reaction shows little tendency to decrease as the exposure to weathering continues.

Various suitable inorganic pigments and fillers as well as organic dyes may be added to the composition.

In making up the present composition, the ingredients may be mixed together in any suitable manner.

The present compositions may be used for insulation purposes, for making molded objects, and for other uses for which polyethylene is suitable.

It is to be understood that the form of the invention herewith shown and described is illustrative of, and does not necessarily constitute a limitation upon, the scope of the invention.

What is claimed is:

1. A polyethylene composition of increased stability toward aging, consisting of polyethylene containing between .01 per cent and 6 per cent by weight of sulfur and between .01 per cent and 2 per cent by weight of a tetraalkyl-thiuram sulfide.

2. A composition as described in claim 1 wherein the accelerator is tetramethyl thiuram disulfide.

3. A composition of improved stability toward aging comprising polyethylene, between .01 per cent and 6 per cent by weight of sulfur, and between .01 per cent and 2 per cent by weight of a thiuram sulfide, said composition being free of other constituents vulcanizable with sulfur.

4. A polyethylene composition of increased stability toward aging consisting of polyethylene containing between .01 per cent and 6 per cent by weight of sulfur and between .01 per cent and 2 per cent by weight of a rubber vulcanization accelerator containing the grouping

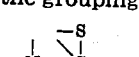

5. A composition as described in claim 4 wherein the accelerator is a thiazyl sulfide.

6. A composition as described in claim 4 wherein the accelerator is benzothiazyl disulfide.

7. A composition of improved stability toward aging comprising polyethylene, between .01 per cent and 6 per cent by weight of sulfur and between .01 per cent and 2 per cent by weight of a rubber vulcanization accelerator containing the grouping

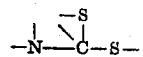

said composition being free of other constituents vulcanizable with sulfur.

BARTHOLOMEW A. STIRATELLI.

REFERENCES CITED

The following references are of record in the file of this patent:

UNITED STATES PATENTS

| Number | Name | Date |
|---|---|---|
| 2,356,955 | Thomas | Aug. 29, 1944 |
| 2,383,839 | Beekley | Aug. 28, 1945 |
| 2,387,518 | Lightbown | Oct. 23, 1945 |
| 2,392,847 | Frolich | Jan. 15, 1946 |
| 2,416,878 | Lindsey | Mar. 4, 1947 |
| 2,455,612 | Schlattman | Dec. 7, 1948 |
| 2,455,910 | Alderson | Dec. 14, 1948 |